United States Patent
Fukushima et al.

(10) Patent No.: US 6,636,690 B1
(45) Date of Patent: Oct. 21, 2003

(54) DIGITAL SIGNAL STORING APPARATUS AND METHOD, PROGRAM RECORDING MEDIUM, DIGITAL SIGNAL RECORDING APPARATUS AND METHOD

(75) Inventors: Seigo Fukushima, Tokyo (JP); Hajime Nishimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/441,263

(22) Filed: Nov. 16, 1999

(30) Foreign Application Priority Data

Nov. 18, 1998 (JP) .............................. 10-328507

(51) Int. Cl.⁷ ................................................ H04N 5/91
(52) U.S. Cl. ........................ 386/94; 386/95; 386/125; 386/126; 380/201; 380/203
(58) Field of Search ................................ 386/94, 95, 83, 386/125, 126; 380/201, 203; H04N 5/91

(56) References Cited

U.S. PATENT DOCUMENTS

| | | | | |
|---|---|---|---|---|
| 5,185,792 A | * | 2/1993 | Shimada | 360/60 |
| 5,621,840 A | * | 4/1997 | Kawamura et al. | 386/68 |
| 5,825,731 A | * | 10/1998 | Yokota | 369/47.12 |
| 6,434,322 B1 | * | 8/2002 | Kimura et al. | 386/94 |
| 6,434,538 B1 | * | 8/2002 | Ibaraki et al. | 705/57 |

FOREIGN PATENT DOCUMENTS

EP 0 860 823 8/1998

* cited by examiner

*Primary Examiner*—Vincent Boccio
*Assistant Examiner*—James A. Fletcher
(74) *Attorney, Agent, or Firm*—Frommer Lawrence & Haug LLP; William S. Frommer; Glenn F. Savit

(57) ABSTRACT

To prevent fraudulent innumerable copies of a copyrighted digital signal from appearing, a dedicated device driver reads the copyrighted digital signal from a card type recording medium, for example, a copy bit flag is added to the digital signal thus read, the copy bit flag indicating that there exists no digital signal identical to the original digital data, and the digital signal having the copy bit flag added thereto is stored into a hard disc.

3 Claims, 4 Drawing Sheets

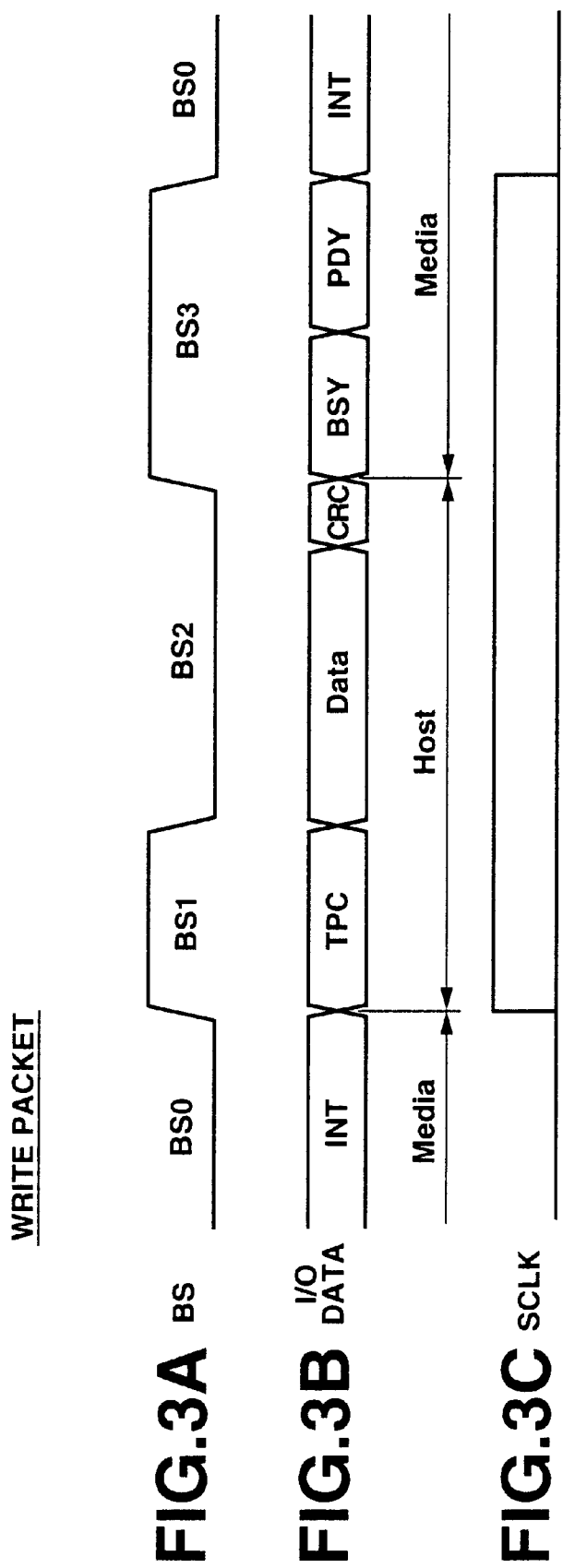

READ PACKET
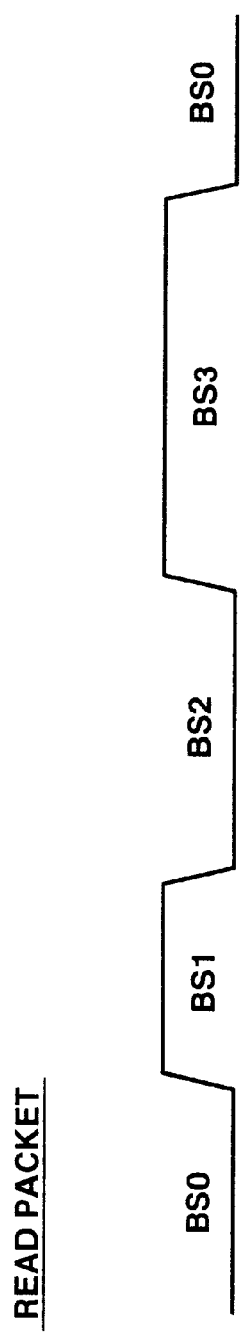
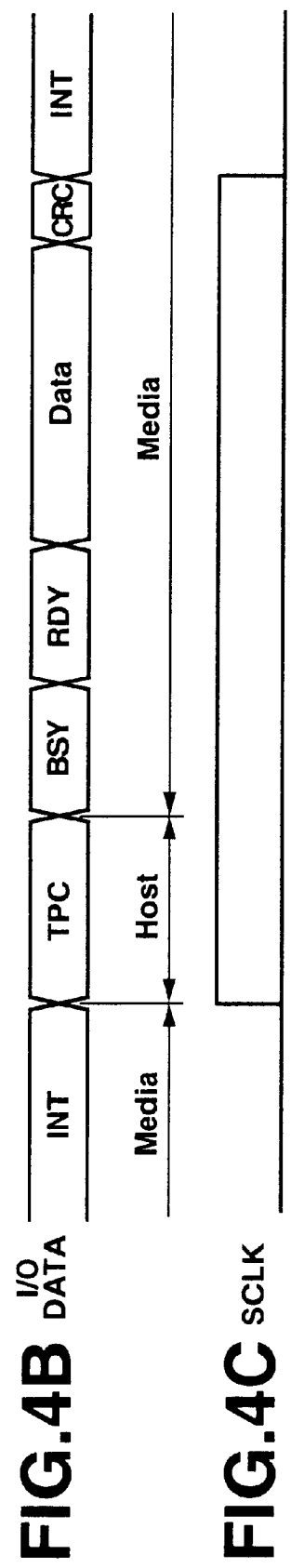
FIG.4A BS
FIG.4B I/O DATA
FIG.4C SCLK

DIGITAL SIGNAL STORING APPARATUS AND METHOD, PROGRAM RECORDING MEDIUM, DIGITAL SIGNAL RECORDING APPARATUS AND METHOD

BACKGROUND OF THE INVENTION

1. Field of the Invention

The present invention relates to a digital signal storing apparatus and method, program recording medium, digital signal recording apparatus and method.

2. Description of the Related Art

The copyright protection system using the SCMS (serial copy management system) used in an MD (mini disc), DAT (digital audio tape recorder), etc. cannot prevent innumerable copies (for example, first-generation copies) from being made of an original digital signal. Therefore, when such a copyright protection system is applied in a currently available current personal computer (PC) connected to a network and other peripheral media than hard discs, a digital signal can be copied repeatedly in a fraudulent manner, and the conventional copyright protection system can scarcely protect the copy of a digital signal.

The conventional copyright protection system cannot prevent a digital signal purchased by a user from being perfectly copied innumerably without any degradation in quality.

OBJECT AND SUMMARY OF THE INVENTION

To prevent such innumerable fraudulent copies of a digital signal, it is necessary that the digital copy once copied cannot be copied any longer.

Accordingly, the present invention has an object to overcome the above-mentioned drawbacks of the prior art by providing a digital signal storing apparatus and method, program recording medium, and a digital signal recording apparatus and method, adapted to prevent a copyrighted digital signal from being copied innumerably in a fraudulent manner.

The above object can be attained by providing a digital signal storage apparatus comprising according to the present invention:

means for reading a copyrighted digital signal;

means for setting a copy bit flag indicating whether there exists any digital signal identical to the copyrighted digital signal; and means for storing the digital signal;

the flag setting means setting in a digital signal from the reading means a copy bit flag which indicates that there exists no digital signal identical to the copyrighted digital signal, and writing the copy bit flag to the storage means, or setting in a digital signal from the storage means a copy bit flag which indicates that there exists a digital signal identical to the copyrighted signal, and providing the digital signal as an output.

Also the above object can be attained by providing a digital signal storing method comprising, according to the present invention, the steps of:

reading a copyrighted digital signal;

setting in the read copyrighted digital signal a copy bit flag indicating whether there exists any digital signal identical to the copyrighted digital signal to be a one which indicates that there exists no digital signal identical to the copyrighted digital signal;

storing the digital signal in which the copy bit flag is set;

reading the stored digital signal; and setting in the read digital signal a copy bit flag which indicates that there exists a digital signal identical to the copyrighted digital signal.

Also the above object can be attained by providing a program recording medium having recorded therein a control program under which:

a copyrighted digital is read;

a copy bit flag which indicates whether there exists any digital signal identical to the copyrighted digital signal is set to be a one which indicates that there exists no digital signal identical to the copyrighted digital signal;

the digital signal in which the copy bit flag is set is stored;

the stored digital signal is read;

a copy bit flag which indicates that there exists a digital signal identical to the copyrighted digital signal is set in the read digital signal; and the read signal is provided as an output.

Also the above object can be attained by providing a digital signal recording apparatus for recording a digital signal stored therein into a recording medium, comprising:

means for storing a digital signal having added thereto a copy bit flag which indicates whether there exists any digital signal identical to the stored digital signal;

means for judging whether the copy bit flag added to the stored digital signal indicates that there exists a digital signal equivalent to the stored digital signal or that there exists no digital signal equivalent to the stored digital signal; and means for ceasing to record into the recording medium a digital signal stored in the storing means when the judging means judges that there exists a digital signal equivalent to the stored digital signal, whereas recording into the recording medium a digital signal stored in the storing means when the judging means judges that there exists no digital signal equivalent to the stored digital signal.

Also the above object can be attained by providing a digital signal recording method of recording a digital signal stored therein into a recording medium, comprising, according to the present invention, the steps of:

storing a digital signal having added thereto a copy bit flag which indicates whether there exists any digital signal identical to the stored digital signal;

judging whether the copy bit flag added to the stored digital signal indicates that there exists a digital signal equivalent to the stored digital signal or that there exists no digital signal equivalent to the stored digital signal; and ceasing to record into the recording medium a digital signal stored in the storing means when it is judged that there exists a digital signal equivalent to the stored digital signal, whereas recording into the recording medium a digital signal stored in the storing means when it is judged that there exists no digital signal equivalent to the stored digital signal.

Also the above object can be attained by providing a program recording medium having recorded therein a control program under which:

a digital signal having added thereto a copy bit flag indicating whether there exist digital signals equivalent to each other;

it is judged whether the copy bit flag added in the digital signal indicates that there exists a digital signal equivalent to the digital signal or that there exists no digital signal equivalent to the digital signal; and recording into the recording medium of a digital signal stored in the storing means is ceased when it is judged that the copy bit flag indicates that there exists a digital signal equivalent to the digital signal, whereas a digital signal stored in the storing means is recorded into the recording medium when it is judged that the copy bit flag indicates that there exists no digital signal equivalent to the digital signal.

Also the above object can be attained by providing a digital signal recording apparatus comprising according to the present invention:

means for storing an original digital signal having added thereto a copy bit flag indicating that there exists a digital signal equivalent to the original digital signal;

means for deleting the digital signal equivalent to the original digital signal from a recording medium in which that digital signal is recorded; and means for rewriting, when deleting the digital signal in consideration by the deleting means, the copy bit flag in the storing means to a one which indicates that there exists no digital signal equivalent to the original digital signal.

Also the above object can be attained by providing a digital signal storing method comprising, according to the present invention, the steps of:

storing an original digital signal having added thereto a copy bit flag indicating that there exists a digital signal equivalent to the original digital signal;

deleting the digital signal equivalent to the original digital signal from a recording medium in which that digital signal is recorded; and rewriting, when deleting the digital signal in consideration by the deleting means, the copy bit flag in the storing means to a one which indicates that there exists no digital signal equivalent to the original digital signal.

Also the above object can be attained by providing a program recording medium having recorded therein a control program under which a digital signal having added thereto a copy bit flag indicating that there exists a digital signal equivalent to the digital signal is stored;

the digital signal equivalent to the stored digital signal is deleted from a recording medium in which it is recorded; and the copy bit flag in the storing means is rewritten, when the digital signal equivalent to the stored digital signal is deleted, to a one indicating that there exists no digital signal equivalent to the stored digital signal.

These objects and other objects, features and advantages of the present intention will become more apparent from the following detailed description of the preferred embodiments of the present invention when taken in conjunction with the accompanying drawings.

BRIEF DESCRIPTION OF THE DRAWINGS

FIG. 3 is a timing chart of the recording operation of the digital signal storage system; and FIG. 4 is a timing chart of the reproducing operating of the digital signal storage system.

DETAILED DESCRIPTION OF THE PREFERRED EMBODIMENTS

Figure 1:
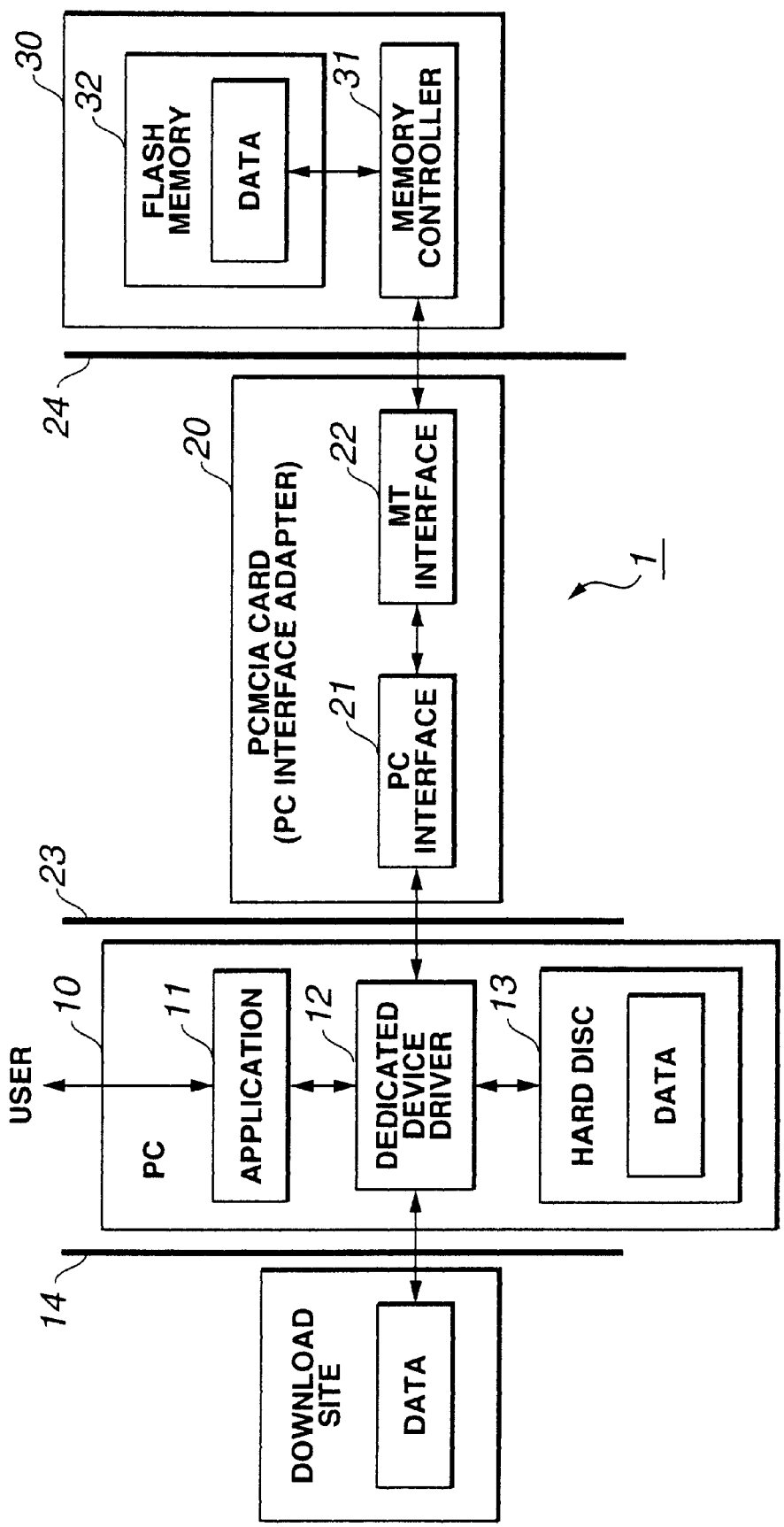
FIG. 1 is a schematic block diagram of a digital signal storage system.

Referring now to FIG. 1, there is schematically illustrated in the form of a block diagram a digital signal storage system according to the present invention. The digital signal storage system is generally indicated with a reference 1.

As shown, the digital signal storage system 1 comprises a host computer 10 which is a personal computer (PC), for example, and a card type recording medium 30 which receives an audio data sent from the host computer 10 via a PCMCIA interface card 20.

The host computer 10 controls read and write of an audio data to and from the card type recording medium 30. It comprises an application 11 to receive an instruction from a user, a dedicated device driver 12 to control each device according to an instruction from the application 11, and a hard disc 13 to store an audio data.

The application 11 is an application software set up as an audio player, for example. It reads an audio data for reproduction.

The dedicated device driver 12 reads an audio data via a network 14 or from the card type recording medium 30, and writes such an audio data to the hard disc 13. Also the dedicated device driver 12 is controlled by the application 11 to read an audio data stored in the hard disc 13.

The PCMCIA interface card 20 is a so-called interface adapter. It comprises a PC interface 21 and a memory technology interface (will be referred to as "MT interface" hereinafter) 22.

The PC interface 21 sends and receives an audio data and control command to and from the dedicated device driver 12 via a PCMCIA bus 23, converts the audio data according to a predetermined standard, and supplies it to the MT interface 22. The PC interface 21 sends the audio data supplied from the MT interface 22 to the dedicated device driver 12 via the PCMCIA bus 23.

The MT interface 22 sends and receives an audio data to and from the card type recording medium 30 via an MT bus 24.

The card type recording medium 30 is a small, portable recording medium. It is removably settable this digital signal storage system 1. The card type recording medium 30 comprises a memory controller 31 to control read, write and deletion of an audio data, and a flash memory 32 to record therein an audio data supplied from the memory controller 31.

The memory controller 31 writes an audio data to the flash memory 32, and deletes an audio data from the flash memory, both in pages.

The flash memory 32 is composed of 1024 blocks. Each of the blocks is composed of 16 pages. Each of the pages is composed of 528 bytes. The page has a normal area of 512 bytes where an audio data is recorded, and a redundant area of 16 bytes where redundant data such as a copyright flag, etc. are recorded. That is, the flash memory 32 has a storage capacity of about 8 megabytes (≈528×16×1024 bytes).

The redundant data includes a copy done bit flag (will be referred to as "CD bit flag" hereinafter). When the CD bit flag is set ("1"), it is meant that audio data has been downloaded from the card type recording medium 30 to the host computer 10. When no CD bit flag is set ("0"), it is meant that no audio data has yet been downloaded from the card type recording medium 30 to the host computer 10. For example, when the user has purchased the card type recording medium 30 but not yet used it, the CD bit flag is "0".

The audio data referred to herein is a copyrighted music software equivalent to contents in a currently prevailing audio CD. It is assumed herein that audio data is installed in the ".wav" format which is a music file used mainly in the Windows (registered trade mark of the Microsoft).

Figure 2:
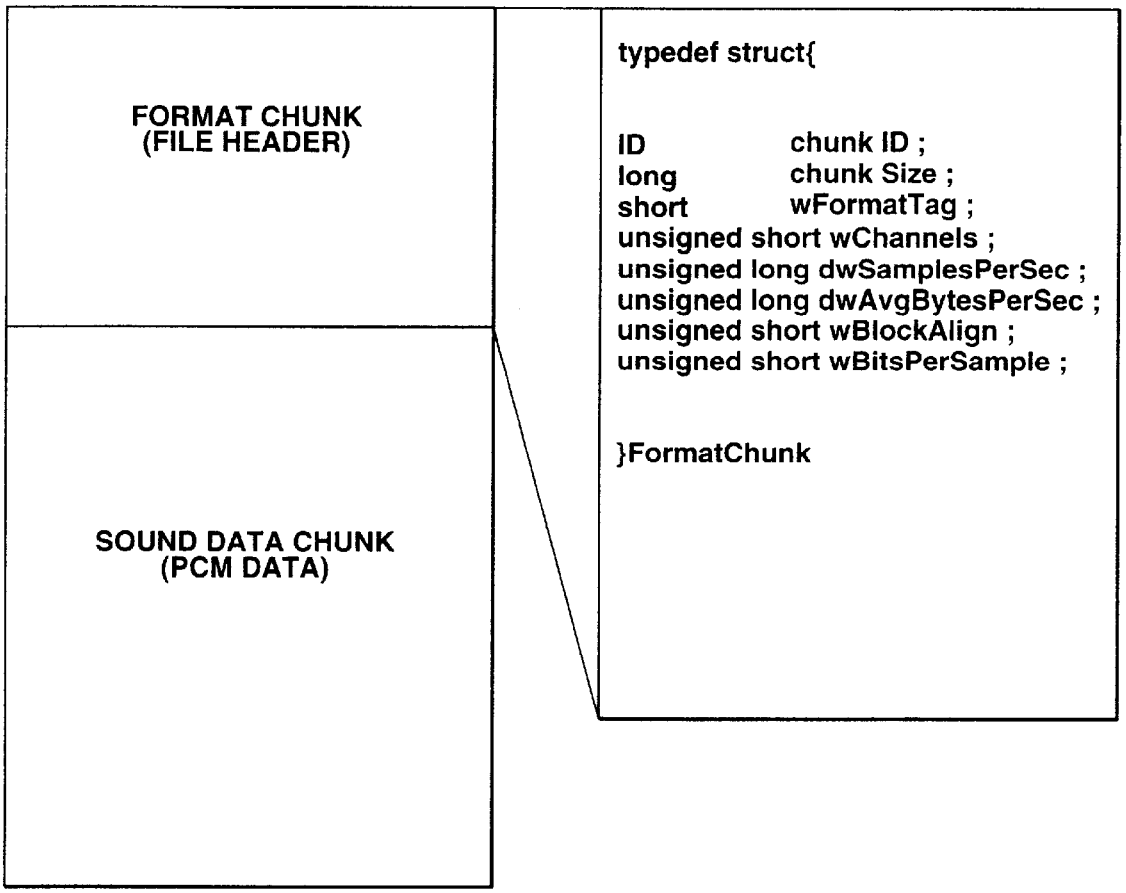
FIG. 2 explains the configuration of a file header of a WAV format file.

As shown in FIG. 2, the WAV format is composed of a format chunk which is a file header and a sound data chunk which is a PCM data. The format chunk is composed of a chunk ID, chunk size (ChunkSize), format tag (wFormatTag), channel (wChannels), etc.

The channel is formed from two bytes. Normally, it is "0x0001" which indicates a monophonic mode or "0x0002" which indicates a stereophonic mode. That is, the most significant bit (MSB) of the channel is normally "0" and scarcely used. In the digital signal storage system 1 of the present invention, the MSB is used as information which indicates whether a file has been duplicated. The MSB will be referred to as "copy bit flag" hereinafter.

When the copy bit flag is set ("1"), it is meant that there exists an audio data identical to an original audio data. That is to say, one audio data exists which is a copy of the original audio data. When the copy bit flag is not set ("0"), it is meant that there exists no audio data identical to the original audio data. Namely, the original audio data has not been copied.

For data recording in the digital signal storage system 1, control signal and audio data are sent and received according to the tiling chart shown in FIG. 3. More specifically, the host computer 10 inverts, and provides as an output, a control signal BS indicative of an operation status at predetermined times to change the operation status as shown in FIG. 3A. Each time the control signal BS is inverted, the operation status will be changed to BS0, BS1, BS2 and BS3, and then to BS0. That is, the four statuses are repeatedly changed. When the operation status is BS1 or BS2, the host computer 10 will operate in a predetermined manner. When the operation status is BS0 or BS3, the PCMCIA interface card 20 (or card type recording medium 30) will operate in a predetermined manner.

When the operation status is BS0, both the host computer 10 and PCMCIA interface card 20 are in the idling status and thus provide no data. When the host computer 10 starts sending TPC (transfer protocol command), the operation status becomes BS1.

When the operation status is BS1, the host computer 10 will send to the PCMCIA interface card 20 a TPC signal for data write as shown in FIG. 3B and a serial clock SCLK as shown in FIG. 3C. Upon completion of sending the TPC signal, the operation status becomes BS2.

When the operation status is BS2, the host computer 10 will send to the PCMCIA interface card 20 audio data read from the hard disc 13, for example, and then a CRC signal being an error correction code. Thus the audio data is recorded into the flash memory 32 of the card type recording medium 30. Upon completion of sending the CRC signal, the operation status becomes BS3.

When the operation status is BS3, the PCMCIA interface card 20 sends to the host computer 10 a busy signal BSY indicating that the flash memory 32 is recording the audio data. Upon completion of the audio data recording, the PCMCIA interface card 20 will send to the host computer 10 a ready signal RDY indicating that the flash memory 32 is ready for accepting a next command. Then the operation status returns to BS0.

In the flash memory 32 in the digital signal storage system 1, an audio data recorded in the flash memory 31 is reproduced as will be described below. Note that also during the data reproduction, there exist four operation statuses BS0, BS1, BS2 and BS3 as shown in FIG. 4A. When the operation status is BS1, the host computer 10 will operate in the predetermined manner. When the operation status is BS0, BS2 or BS3, the PCMCIA interface card 20 (or the card type recording medium 30) will operate in the predetermined manner.

When the operations status is BS0, both the host computer 10 and PCMCIA interface card 20 are in the idling status and thus provide no data. When the host computer 10 starts sending a TPC signal, the operation status becomes BS1.

When the operation status is BS1, the host computer 10 will send to the PCMCIA interface card 20 a TPC signal carrying a message of data reading as shown in FIG. 4B and a serial clock SCLK as shown in FIG. 4C. Upon completion of sending the TPC signal, the operation status becomes BS2.

When the operation status is BS2, the PCMCIA interface card 20 sends to the host computer 10 a busy signal BSY indicating that it is getting ready for reading an audio data from the flash memory 32. When the PCMCIA interface card 20 is ready for the audio data read, it will send a ready signal RDY indicating that it is ready for reading audio data. Upon completion of sending the RDY signal, the operation status becomes BS3.

When the operation status is BS3, the PCMCIA interface card 20 sends to the host computer 10 an audio data read from the flash memory 32 and then a CRC signal after completion of the data sending. In the host computer 10, the audio data sent from the PCMCIA interface card 20 is stored into the hard disc 13. Upon completion of sending th CRC signal, the operation status returns to BS0.

For enjoying a music data (will be referred to as "audio data" hereinafter) in the digital signal storage system 1 constructed as described in the foregoing, the user has to purchase the data and store it into the hard disc 13 of the host computer 10.

An audio data can be purchased via two routes. One is a route via a network such as an internet, telephone line, etc. The other route uses the card type recording medium 30 in which audio data have been cumulated beforehand. In the latter case, the user has to purchase the recording medium 30 and read a desired audio data from it.

More particularly, when the user selects the former one of the above two routes, he or she has to download a desired audio data from a pay download site operated by a recording company, for example. When he selects the latter route, he has to purchase the card type recording medium 30 in which audio data he desires are recorded, and to install the recording medium 30 in the digital signal storage system 1 for enjoying the audio data.

First, the user uses the application 11 to make an instruction to store an audio data into the hard disc 13. The application 11 will convey the user's instruction to the dedicated device driver 12.

When reading an audio data from the card type recording medium 30, the dedicated device driver 12 judges, via the PCMCIA interface card 20, memory controller 31, etc., if the CD bit flag is set for the flash memory ("1"). When the dedicated device driver 12 has judged that the CD bit flag is set, it will cease to read audio data from the flash memory 32.

On the other hand, when the dedicated device driver 12 has judged that the CD bit flag is not set, it will read audio data from the flash memory 32. For this purpose, the dedicated device driver 12 will rewrite the CD bit flag for the flash memory 32 from "0" to "1".

The dedicated device driver 12 stores the audio data thus read into the hard disc 13 via the PCMCIA interface card 20. For this purpose, the dedicated device driver 12 will set the copy bit flag in the WAV file of the audio data to "0" before writing the audio data to the hard disc 13.

Also, the dedicated device driver 12 downloads audio data from outside via the network 14 such as an internet according to the instructions from the application 11, sets the copy bit flag to "0", and then writes the audio data into the hard disc 13.

As in the foregoing, the digital signal storage system 1 is adapted to rewrite, when the audio data is read, for copying, from the card type recording medium 30, the CD bit flag to "1" so that two or more copies of an audio data will not coexist.

Also, by setting a copy bit flag in a file of a general-purpose WAV format, it is possible to judge whether or not there exists any copy of an audio data formed from such files.

The aforementioned operations of the dedicated device driver 12 can also be effected by installing a program recorded in a recording medium such as an optical disc into the digital signal storage system 1. More specifically, similar operations of the dedicated device driver 12 to the above can be effected by installing, from the recording medium into the digital signal storage system 1, a control program under which a copyrighted audio data is read from a home page or the like, a copy bit flag, indicating whether or not there exists any audio data identical to the copyrighted audio data, is so set as to indicate that there exists no audio data identical to the copyrighted data, the audio data for which the copy bit flag is set is stored into the hard disc 13, the stored audio data is read from the hard disc 13, the copy bit flag is so set as to indicate that there exists an audio data identical to the audio data read from the hard disc 13 and the audio data is provided as an output.

Next, recording of audio data stored in the hard disc 13 into the card type recording medium 30 will be described.

When the user operates the host computer 10 in the digital signal storage system 1 to copy a desired audio data stored in the hard disc 13 into the card type recording medium 30, the application 11 will convey the user's instruction for copy to the dedicated device driver 12.

The dedicated device driver 12 judges, according to the instruction from the application 11, whether a copy bit flag is set in the designated audio data. If the dedicated device driver 12 judges that the copy bit flag is set in the designated audio data, a copy of that audio data already exists. In this case, the dedicated device driver 12 ceases to copy the audio data. A message informing the user that no copy of the designated audio data is possible is displayed on a monitor (not shown) via the application 11.

On the other hand, when the dedicated device driver 12 judges that the copy bit flag is not set, it will rewrite the copy bit flag for the hard disc 13 from "0" to "1" to read the audio data. The dedicated device driver 12 sends the read audio data to the card type recording medium 13 via the PCMCIA interface card 20, MT bus 24, etc. The memory controller 31 of the card type recording medium 30 writes the supplied audio data to the flash memory 32.

In the digital signal storage system 1, there is set in an audio data stored in the hard disc 13 a copy bit flag indicating whether the audio data has been copied or not. By controlling the status of the copy bit flag as in the foregoing, it is possible to prevent two copies of an audio data from coexisting. Therefore, when an audio data is copyrighted, it is possible to prevent the audio data from being copied innumerably, thereby protecting the copyright of the audio data.

Note that the aforementioned operations of the dedicated device driver 12 can be effected by installing a program recorded in a recording medium such as an optical disc into the digital signal storage system 1. More specifically, similar operations of the dedicated device driver 12 to the above can be effected by installing, from the recording medium into the digital signal storage system 1, a control program under which it is judged whether a copy bit flag added to an audio data indicates that an audio data identical to the audio data in consideration exists or not, and when it is judged that the copy bit flag indicates that an audio data identical to the audio data in consideration exists, it is ceased to record the audio data stored in the hard disc 13 into the card type recording medium 30, whereas when it is judged that the copy bit flag indicates that there exists no audio data identical to the audio data in consideration, the audio data stored in the hard disc 13 is recorded into the card type recording medium 30.

Also, after recording the audio data into the card type recording medium 30, the user may remove the card type recording medium 30 from the digital signal storage system 1, and reproduce the audio data using the card type recording medium 30 in a dedicated reproducing apparatus.

Next, deleting an audio data recorded in the card type recording medium 30 will be described.

When the user operates the host computer 10 to delete an audio data recorded in the card type recording medium 30, the application 11 will control the dedicated device driver 12 to delete the audio data.

According to the instruction from the host computer 10, the dedicated device driver 12 will delete the audio data from the flash memory 32 of the card type recording medium 30 via the PCMCIA interface card 20. For this purpose, the dedicated device driver 12 will rewrite the copy bit flag, for an audio data stored in the hard disc 13 and same as the deleted one, from "1" to "0". Thus, when the audio data recorded in the card type recording medium 30 is deleted, audio data can be copied again from the hard disc 13 to the card type recording medium 30.

As in the foregoing, the digital signal storage system 1 according to the present invention is adapted such that audio data stored in the hard disc 13 can be copied only once. However, after an audio data is deleted from the card type recording medium 30, the copy bit flag in the audio data in the hard disc 13 is rewritten to "0" so that the audio data can be copied again.

Thus, when the user loses interest in the audio data recorded in the card type recording medium 30, he can delete the audio data from the card type recording medium 30 and copy another audio data he desires from the hard disc 13 into another card type recording medium 30.

It should be noted that the aforementioned operations of the dedicated device driver 12 can be effected by installing a program recorded in a recording medium such as an optical disc. More specifically, similar operations of the dedicated device driver 12 to the above can be effected by installing, from the recording medium into the digital signal storage system 1, a control program under which an audio data identical to a one recorded in the recording medium is deleted while the copy bit flag for the hard disc 13 is so rewritten as to indicated that there exists no audio data identical to the audio data in consideration.

In the digital signal storage system 1, only one copy of a copyrighted audio data the user has purchased is allowed to exist, thereby preventing innumerable fraudulent copies from prevailing to protect the copyright of the digital signal.

By deleting the audio data from the card type recording medium 30, it is possible to copy an audio data from the hard disc 13 into the card type recording medium 30. Using this technique, the user can move an audio data from one card type recording medium to another one. Namely, the user can repeat copying many times.

Also, using the general-purpose WAV format file, it is possible to protect a copyright of a music data already prevailing without converting the WAV format file to any special file.

Note that the present invention is not limited to aforementioned embodiment but may be applied to a video data in place of audio data.

As having been described in the foregoing, in the digital signal storing apparatus and method and the program recording medium, there is set and stored in a read digital signal a copy bit flag which indicates that there exists no digital signal identical to the read digital signal, or there is so set in a digital signal stored once and read a copy bit flag which indicates that there exists a digital signal identical to the digital signal, and the digital signal is provided as an output. Thus the digital signal can be prevented from being copied if the digital signal has already been copied.

In the digital signal recording apparatus and method and the program recording medium, it is judged whether a copy bit flag added to a digital signal indicates that there exists a digital signal identical to the digital signal or that there exists no digital signal identical to the digital signal, and when it is judged that there exists a digital signal identical to the digital signal in consideration, it is ceased to record the stored digital signal into the recording medium, whereas when it is judged that there exists no digital signal identical to the digital signal in consideration, the stored digital signal is recorded into the recording medium. Thus, one digital signal can be prevented from being copied many times, so that the digital signal can be prevented from being copied innumerably in a fraudulent manner.

In the digital signal storing apparatus and method and the program recording medium, an original digital signal having added thereto a copy bit flag indicating that there exists a digital signal identical to the original digital signal is stored, and when the digital signal identical to the original digital signal and stored in the recording medium is deleted from the recording medium, the copy bit flag is so rewritten as to indicate that there exists no digital signal identical to the original digital signal. Thus, when the digital signal is deleted from the recording medium, a copy can be made of the original digital signal.

What is claimed is:

1. A digital signal recording apparatus, comprising:

means for storing an original digital signal having added thereto a copy bit flag indicating that there exists a digital signal equivalent to the original digital signal;

means for deleting the digital signal equivalent to the original digital signal from a recording medium in which that digital signal is recorded; and means for rewriting, when deleting the digital signal by the deleting means, the copy bit flag in the storing means to a one which indicates that there exists no digital signal equivalent to the original digital signal.

2. A digital signal storing method, comprising the steps of:

storing an original digital signal having added thereto a copy bit flag indicating that there exists a digital signal equivalent to the original digital signal;

deleting the digital signal equivalent to the original digital signal from a recording medium in which that digital signal is recorded; and rewriting, when the digital signal is deleted, the copy bit flag in the storing means to a one which indicates that there exists no digital signal equivalent to the original digital signal.

3. A program recording medium having recorded therein a control program under which a digital signal having added thereto a copy bit flag indicating that there exists a digital signal equivalent to the digital signal is stored;

the digital signal equivalent to the stored digital signal is deleted from a recording medium in which it is recorded; and the copy bit flag in the storing means is rewritten, when the digital signal equivalent to the stored digital signal is deleted, to a one indicating that there exists no digital signal equivalent to the stored digital signal.

* * * * *